July 4, 1961 — J. MACIAS-SARRIA — 2,990,923
RETICULATED SUN SHADE
Filed Oct. 7, 1958 — 4 Sheets-Sheet 1

INVENTOR.
JOSÉ MACIAS-SARRIA
BY
ATTORNEY.

July 4, 1961    J. MACIAS-SARRIA    2,990,923
RETICULATED SUN SHADE

Filed Oct. 7, 1958    4 Sheets-Sheet 2

INVENTOR.
JOSÉ MACIAS-SARRIA
BY
ATTORNEY.

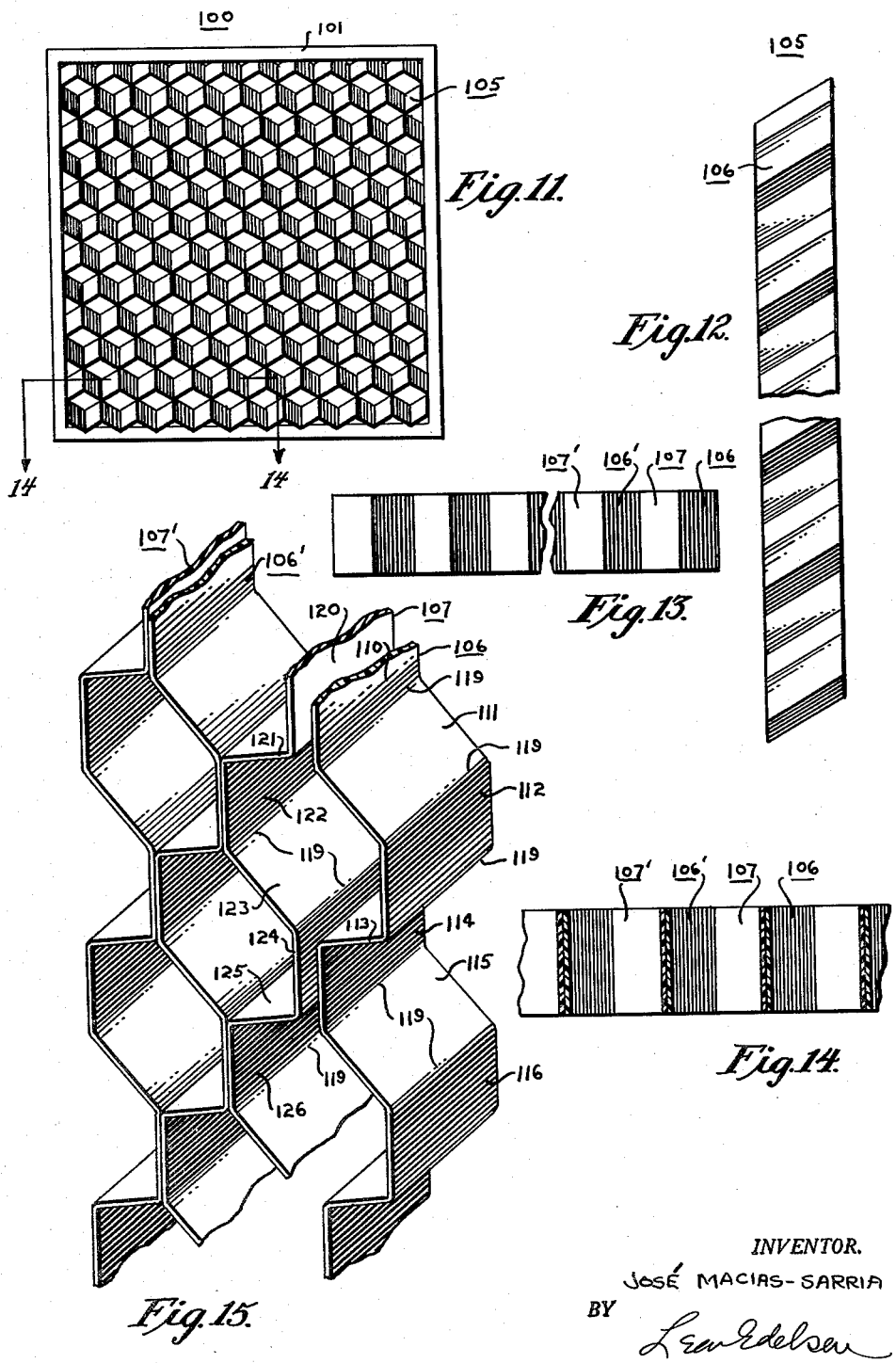

July 4, 1961
J. MACIAS-SARRIA
2,990,923
RETICULATED SUN SHADE
Filed Oct. 7, 1958
4 Sheets-Sheet 4
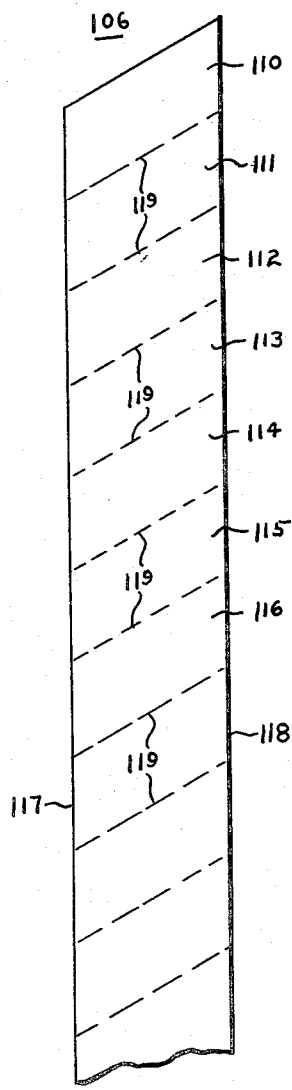
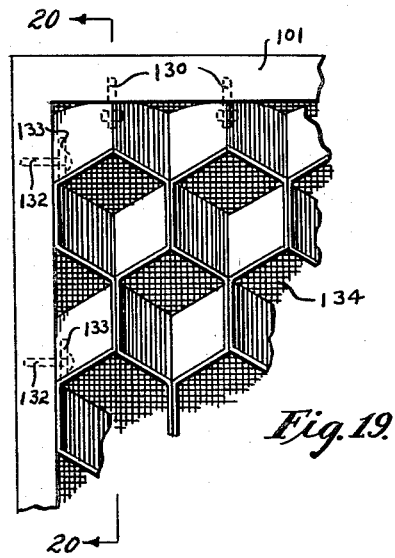
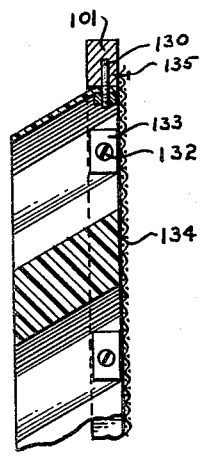
Fig. 16.   Fig. 17.   Fig. 18.   Fig. 19.   Fig. 20.
INVENTOR.
JOSÉ MACIAS-SARRIA
BY
ATTORNEY United States Patent Office 2,990,923
Patented July 4, 1961

2,990,923
RETICULATED SUN SHADE
José Macias-Sarria, 320 S. Juniper St., Philadelphia, Pa.
Filed Oct. 7, 1958, Ser. No. 765,889
3 Claims. (Cl. 189—63)

This invention relates to sun shades, and more particularly to sun shades mounted exteriorly of windows and doors for preventing the direct rays of the sun from passing to the interior.

In the past, sun shades of various types have been known which were designed for exterior mounting to intercept the rays of the sun. These known types of sun shades may be generally classified as canopies, and are normally made of either a pliable material such as canvas which may be rolled up, or take the form of a rigid or semi-rigid canopy fabricated from materials such as aluminum. Canopy types of sun shades, in order to be effective in preventing the direct rays of the sun from penetrating into a room, necessarily extend a substantial distance beyond the plane of the window or door with which they are associated. This outward extension or overhang is necessitated by the fact that canopies must intercept the sun's rays over the entire vertical extent of the window or door, and if a substantial amount of light and ventilation is not to be excluded such canopies cover at most the upper half of the vertical extent of such window or door and are therefore compelled to be extended outward a substantial distance. If such conventional types of canopy were not extended outward a substantial distance then no protection would be afforded from the sun's rays when the sun departs from an almost directly overhead position. Moreover, in order to adequately protect a door, the canopy must frequently take the form where it extends substantially horizontally outward for some distance before angling downward in order that the door which is being shaded may be opened.

Canopies of the foregoing types which are sufficiently large to be effective in preventing direct penetration of the sun's rays suffer from several major disadvantages. Firstly, the large size materially reduces the amount of ventilation and light which may be received through the window or door. Secondly, the relatively large size of such canopies and the necessary tent like shape which they assume, makes them highly susceptible to damage by wind gusts, and it is not unusual that such canopies have been seriously damaged and sometimes completely torn away from their mountings by sudden sharp gusts of wind. These serious shortcomings may be to a certain extent reduced by reducing the physical size of the canopy; however, any size reduction which is sufficient to materially reduce the foregoing enumerated difficulties also renders the sun shade practically worthless in the performance of its primary function, that is, the prevention of the penetration of direct sunlight into the shaded area.

In contrast to the above described canopy type of sun shade, my invention contemplates a sun shade design of a totally different structural configuration which is not subject to the many serious shortcomings of canopies. Basically, my invention contemplates the use of a honeycomb lattice structure which covers the entire expanse of the window or door through which direct sunlight may penetrate. Consequently, there is no need to utilize large tent like structures which extend substantially beyond the plane of the window or door. In the case of the door, the honeycomb shade may be mounted directly thereto and move with the door as it is opened and closed. One major aspect of my invention is that the individual cells of the honeycomb have their axes oriented at an acute angle to the plane of the door or window to be shaded, and the cell depth is made sufficiently long so that direct sunlight may only pass through the cells when the sun is so low in the sky that the heating effect of the penetrating rays is negligible. Accordingly, it is a primary object of my invention to provide a novel sun shade which provides substantially complete shielding from the rays of the sun over the entire surface of a window or door and which at the same time allows for substantially unattenuated light transmission and ventilation through the shade to the interior of the shaded area.

It is another object of my invention to provide a novel sun shade of relatively flat construction which is materially less susceptible to the destructive effects of sudden sharp gusts of wind.

Still another object of my invention is to provide a novel sun shade which is functionally superior to the canopy type of shade, and at the same time is capable of providing highly decorative effects not possible to achieve with canopies.

Another object of my invention is to provide a novel sun shade which may be readily installed and removed from the inside of a building without requiring the installer to place himself in a physically dangerous position.

The foregoing and other objects of my invention will become apparent hereinafter from a careful reading of the following specification when taken in conjunction with the several figures, wherein:

FIGURE 11 is a front elevational view of a sun shade having an alternative honeycomb lattice construction to that of FIGURE 1.

FIGURE 12 is a side elevational view of the honeycomb structure of FIGURE 11.

FIGURE 13 is a plan view of the honeycomb structure illustrated in FIGURE 11.

FIGURE 14 is a sectional view taken along the lines 14—14 of FIGURE 11.

FIGURE 15 is an enlarged fragmentary perspective view of the honeycomb structure of FIGURE 11.

FIGURE 16 illustrates a flat strip of material from which may be fabricated the structure illustrated in FIGURE 15.

FIGURE 17 is a side elevational view of a collapsed honeycomb of the type shown in FIGURE 15.

FIGURE 18 is a front elevational view of the structure shown in side elevation in FIGURE 17.

FIGURE 19 is a corner fragment shown in front elevation of a sun shade having a honeycomb of the type illustrated in FIGURE 11 with a screen mounted to the frame behind the honeycomb.

FIGURE 20 is a sectional view taken along the lines 20—20 of FIGURE 19.

In the several figures like elements are denoted by like reference characters.

Figure 1:
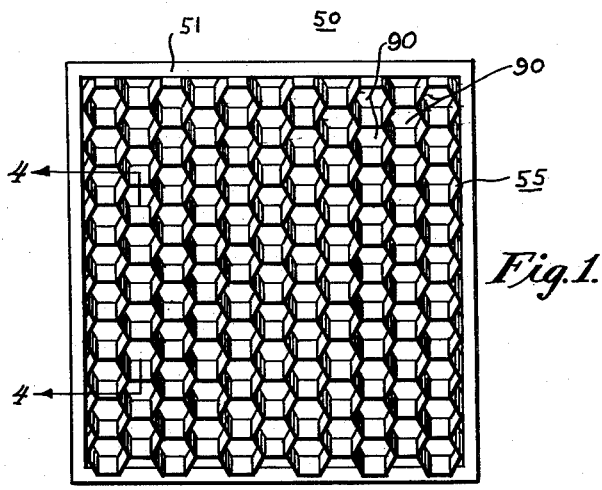
FIGURE 1 is a front elevational view of a preferred embodiment of the sun shade according to my invention which illustrates a honeycomb lattice structure mounted in a frame.

Turning now to an examination of the figures, consider first FIGURE 1 where there will be seen a sun share 50 which includes a frame 51 and a honeycomb lattice structure 55. The honeycomb structure 55 is seen to consist of a plurality of hexagonal cells 90. It is clear from the showing of FIGURE 1 that the axis of each cell 90 is oriented at an acute angle to the plane of the sun shade 50 so that when viewed in front elevation, as illustrated, the hexagonal cell opening is of substantially reduced area. The degree to which the area appears reduced to an observer is determined by the depth of the cell together with the angle of orientation of the cell axis relative to the plane of the shade. The honeycomb design may be completely determined when two factors have been decided upon. Firstly, the maximum permissible depth of a cell 90 as measured in a direction perpendicular to the plane of the shade 50 should be determined. Secondly, the highest angle of the sun which permits direct transmission of the sun's rays through the shade must be fixed. When these two factors have been determined, the cell dimensions and cell axis orientation may be readily calculated.

Figure 2:
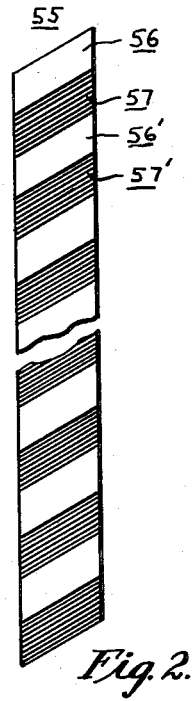
FIGURE 2 is a side elevational view of the honeycomb structure shown in FIGURE 1.
Figure 3:
FIGURE 3 is a plan view of the honeycomb structure illustrated in FIGURE 1.
Figure 4:
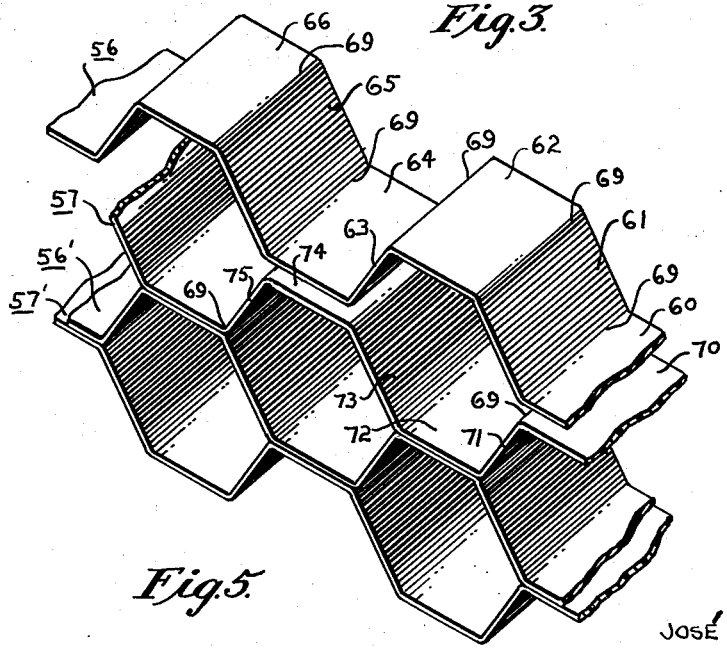
FIGURE 4 is a sectional view taken along the lines 4—4 of FIGURE 1 and illustrating certain constructional details.

Of course, it should be borne in mind, that the design parameters just mentioned will vary in accordance with the location in which the sun shade is to be installed. For example, in relatively temperate climate areas, direct sunlight at higher elevations of the sun may produce a heating effect less objectionable than that produced by direct sunlight at a lower elevation of the sun in a tropical region. Consequently, the honeycomb cell axis may be made more nearly perpendicular to the plane of the shade in the former case than in the latter. Similarly, when sun shades according to my invention are installed for example on windows of an office building the cell axis may similarly approach more closely to the perpendicular relative to the plane of the sun shade by virtue of the fact that surrounding buildings will block out direct sunlight at higher sun elevations than would be the case in a relatively unobstructed area. The cell axis inclination illustrated in the structure of the sun shade of FIGURE 1 together with the illustrated cell depth combine to block out sunlight above approximately 30 degrees inclination to the horizontal, as may be readily established by reference to FIGURES 2, 4 and 10.

The honeycomb structure of the sun shade of FIGURE 1 may be made in any of several different ways, as for example by casting or molding the honeycomb in integral form. Such a honeycomb could for example be molded of thermo-setting plastic and subsequently cut to the desired size. Alternatively, the honeycomb may be fabricated from strips of material which are fastened together in a particular way to form the honeycomb, such an alternative method of fabrication being illustrated in FIGURES 4, 5, 6, 9 and 10. The strips of material may be either pliable or of relatively stiff characteristics as for example certain plastics may be utilized or thin metal strips fashioned perhaps from aluminum. However, regardless of the particular material of which the strips consist the geometric shape of the strips will be determined in accordance with the design parameter considerations already pointed out.

Figure 5:
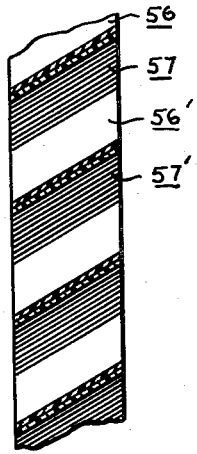
FIGURE 5 is an enlarged perspective fragmented view of the honeycomb structure illustrating the method of making a honeycomb from strips of material.

Referring now to FIGURE 5, it will be seen that the honeycomb structure shown therein is built up of a plurality of strips 56, 57, 56' and 57'. In FIGURE 5, the strip 56 has been elevated somewhat relative to the underlying strip 57 to more clearly illustrate the shape assumed by an individual strip. It will be further observed that the strip 56' is of exactly the same configuration as the strip 56, whereas the strips 57 and 57' correspond to the strips 56 and 56' in inverted position.

Figure 6:
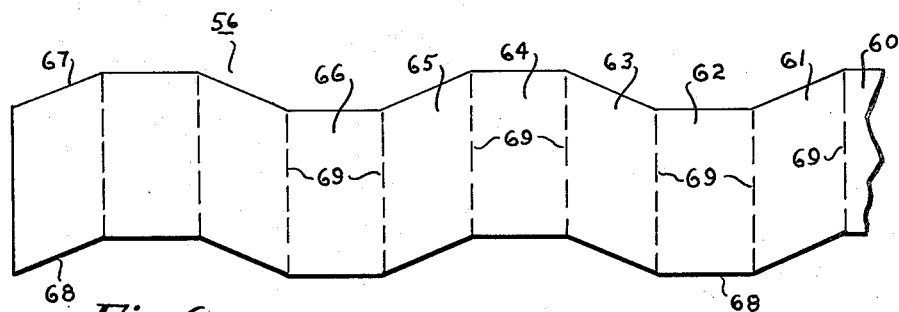
FIGURE 6 is a plan view of a flat blank strip which may be utilized in the construction of the honeycomb, the dashes illustrating fold lines.

FIGURE 6 illustrates the plan view appearance of the strips 56 and 56' when they are flattened out to lie completely in one plane. The departure of the longitudinally extending edges 67 and 68 of the strip 56 from linearity is of course dictated by the deviation of the cell axis from perpendicularity relative to the plane of the shade. In the event that the axes of the honeycomb cells 90 were desired to be perpendicular to the plane of the shade 50, then of course, the edges 67 and 68 of the strip 56 would extend rectilinearly. The strip 56 is seen to be divided into a plurality of equal width panels, some of which are designated by the reference numerals 60 through 66, by the dashed lines 69. The dashed lines 69 represent folds or crease lines along which the strip 56 is transversely folded into the convoluted form illustrated in FIGURE 5. When the underlying strip 57 has been similarly convoluted to define the panels 70 through 75 and placed in its illustrated position underlying the strip 56, a hexagonal cell is formed with its upper-three walls being defined by the panel sections 61, 62 and 63 of the strip 56 and its lower-three walls being defined by the panels 71, 72 and 73 of the strip 57. The laterally spaced panels 60 and 64 of the strip 56 and their corresponding underlying panels 70 and 74 of the strip 57 partially define the walls of adjacent cells. The strips 56 and 57 must be secured together so that the panels 60 and 70 are in close contact throughout their surficial extent, and similarly, for the panels 64 and 74 and other correspondingly positioned panels. Such securement may be effected by means of adhesives, stitching, welding or soldering, or other methods particularly suited for use with particular types of materials.

Figure 9:
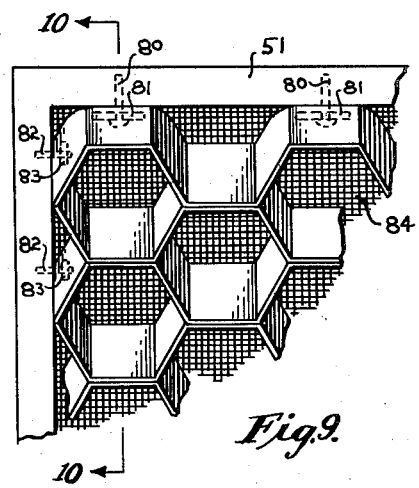
FIGURE 9 illustrates a corner portion of a modified form of the invention showing a screen behind the honeycomb lattice, and one method of securing the honeycomb to the frame.
Figure 10:
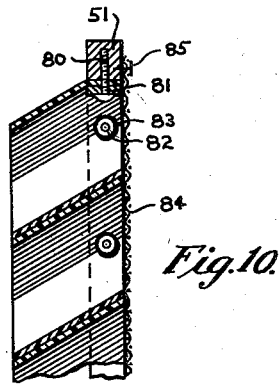
FIGURE 10 is a sectional view taken along the lines 10—10 of FIGURE 9.

Understanding now the method of fabricating a honeycomb from a plurality of strips of material, turn now to a consideration of the details illustrated in FIGURES 9 and 10. Although a honeycomb structure as described in the foregoing may be utilized as a shade by itself, particularly if it is fabricated from materials having sufficient stiffness to be self-supporting, it will be found to be frequently desirable to enclose the honeycomb in a frame such as that illustrated at 51 in FIGURES 1, 9 and 10. Such a frame 51 provides a complete sun shade which is easily handled for installation, and which provides the further desirable characteristic of a mount or supporting means for a screen such as that illustrated at 84 in FIGURES 9 and 10. The screen 84 may of course easily be secured to the frame 51 by means of tacks 85, or staples or other well-known fastening devices.

Figure 8:
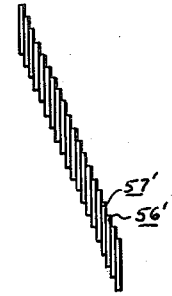
FIGURE 8 shows a side view of the collapsed honeycomb of FIGURE 7.

The honeycomb itself may be readily secured to the frame 51 by means of the screws 80 and cleats 81, and the screws 82 and washers 83. The cleats 81 are shown as being of a length corresponding to substantially the width of a panel forming the top of a honeycomb cell. Although such a shape is not mandatory, it aids in preventing sag which might occur in the event that the honeycomb were fabricated from a relatively pliable material. The washers 83 which secure the sides of the honeycomb to the frame 51 need not of course provide any function other than that of preventing the screws 82 from tearing through the sides of the honeycomb structure. The honeycomb sun shade as illustrated in FIGURES 1, 9 and 10 may readily be installed from the inside of the building in the same manner as an ordinary window screen, and may be just as readily removed for purposes of storage. When the honeycomb is made of a relatively flexible strip material, it may itself be demounted from the frame 51 and collapsed into a relatively flat, readily stored, package as illustrated in FIGURE 8.

It will, of course, be appreciated that a honeycomb lattice fabricated from pliable material need not be secured to a frame, but may in the alternative be hung in such a way that it may be collapsed while mounted to a door or window, as for example by a Venetian blind type of mounting.

Turning now to a consideration of FIGURES 11 through 20 which illustrate an alternative embodiment of my invention, it is observed that the difference between FIGURE 11 and FIGURE 1 resides in the orientation of the hexagonal cells which compose the honeycomb. The structural and constructional details of the honeycomb 105 of FIGURE 11 are clearly detailed in FIGURES 12 through 16. FIGURES 15 and 16 most clearly bring out the difference between the honeycomb according to FIGURE 11 and that of FIGURE 1. It will be observed in FIGURE 16 that the panels 110 through 116 are defined by the fold lines 119 laid out on a strip 106 having rectilinearly extending sides 117 and 118. The fold lines 119 all extend parallel to the axis of the hexagonal cells which will be partially formed by the strip 106, and it is evident therefore that the orientation of the hexagonal cell axes relative to the plane of the sun shade 100 is determined by the angle of the fold lines 119 relative to the horizontal.

In contrast to this, it will be recalled that the angle of the hexagonal cells of the sun shade of FIGURE 1 is determined in the strip of FIGURE 6 not by the fold lines 69, but by the manner in which the strip edges 67 and 68 vary along the strip length. Consequently, a greater degree of constructional flexibility is achieved by the construction of FIGURE 11 because the strips 106 as illustrated in FIGURE 16 may be first cut to size, and subsequently folded with the fold lines 119 oriented at any given desired angle. Once however, the strip 56 illustrated in FIGURE 6 has been cut to its particular shape, the orientation of the hexagonal cell axes is completely fixed. FIGURE 15 illustrates the manner of building up the honeycomb structure 105 from a plurality of strips, as for example the strips 106, 107, 106' and 107'. Exactly the same considerations relative to securing these separate strips together to form the completed honeycomb apply to the structure of FIGURE 15 as have already been described in connection with the honeycomb of FIGURE 5.

Figure 7:
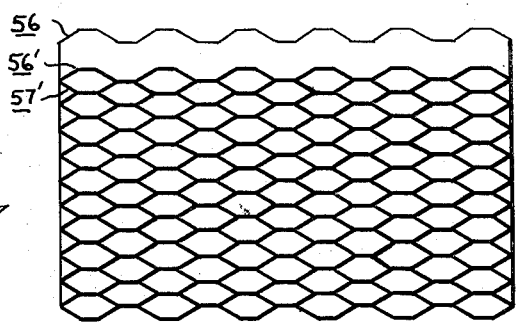
FIGURE 7 illustrates in diagrammatic form a plan view of the honeycomb in collapsed condition preparatory to being stored away.

FIGURES 17 and 18 correspond to FIGURES 7 and 8 and illustrate the honeycomb of FIGURE 15 and FIGURE 11 in a collapsed condition for easy storage. FIGURES 19 and 20 correspond of course to FIGURES 9 and 10 and illustrate the same aspects already described with regard to these latter two figures, however, in connection with the honeycomb structure of the sun shade of FIGURE 11. The honeycomb of FIGURE 11 is secured to the frame 101 by the screws 130 and 132, the latter being fitted with cleats 133 which correspond in function to the cleats 81 of FIGURE 9. FIGURES 19 and 20 also illustrate a screen 134 secured to the frame 101 by tacks 135.

It will be appreciated that both forms of the sun shade as hereinbefore described may be drawn into collapsed form while suitably suspended for use as a sun screen. Thus, as respects the form of the sun shade as shown in FIGURES 1 to 10 inclusive, it will be apparent that when such shade is supported from an overhead support such as the top horizontally extending member of the frame 51 but which frame has in such case no vertically extending side members, the shade may be drawn upwards by suitable draw cords extending through laterally spaced vertical rows of the hexagonal shaped cells which characterise the shade to thereby compact the shade in its vertical dimension. In other words, the shade of FIGURES 1 to 10 when mounted from an overhead support, may be drawn upwardly to compact the same very much as a Venetian blind is now drawn upwardly toward its overhead support.

Now as respects the construction of shade shown in FIGURES 11 to 20 inclusive, such a shade may be suspended from an overhead support which may consist of a rod extending horizontally through apertures formed in the top portions of the shade and upon which rod the several laterally spaced vertical rows of hexagonal cells may be laterally moved into compacted or expanded relation. Thus, if a single unit sun shade is employed for a given window opening, such a shade constructed in accordance with the modification of FIGURES 11 to 20 may be laterally drawn toward one side or the other of said window opening. In certain cases and under certain conditions it may be desirable to provide a given window opening with a pair of such sun shade units which may be drawn apart to expose the central portion of the window opening, this operation being very much on the order of that employed in connection with conventional draw curtains.

Although my invention has been described and illustrated by particular embodiments thereof, variations and changes may be made from time to time by those persons normally skilled in the art without departing from the essential spirit or scope of my invention, and accordingly, it is intended to claim the same broadly as well as specifically, as denoted by the appended claims.

What is claimed as new and useful is:

1. A sun shade adapted for mounting to the exterior of a window or door comprising a plurality of open-ended hexagonal cells arranged in a lattice, the sidewalls of each cell extending in directions transverse to the plane of the lattice, each of said cells having an axis geometrically centered relative to the cell sidewalls, said cells being so oriented within the lattice that the said axes are inclined at acute angles to the plane of the lattice, said cell lattice comprising a plurality of pre-cut individual strips of pliable material convoluted and secured together to define the individual cells of the lattice, each of said pliable material strips being convoluted about transversely extending parallel fold lines located at equispaced points along its length, the fold lines being disposed to provide a plurality of pairs thereof so arranged that successive pairs are laterally offset from one another with alternate pairs disposed in a common plane, whereby each convoluted strip is in the form of a chain of identical half-hexagons with successive half-hexagons in the chain inverted relative to one another, the half-hexagons of a given convoluted strip being complemental to proximate half-hexagons of a next adjoining convoluted strip to conjointly form between said adjoining strips a series of identical hexagonal cells, the adjacent parallel extending cell-forming strips occupying positions shifted lengthwise of one another so that a surface of one strip is in face-to-face contact with a parallel surface of an adjacent strip, the contacting surfaces being secured to one another to form double thick wall sections common to two hexagonal cells, the single thickness convoluted strip portions joining the said double thick wall sections being shiftable relatively thereto about said fold lines into planes common therewith whereby the said lattice is collapsible so that said strips individually may assume a substantially flat non-convoluted form.

2. The sun shade according to claim 1 wherein said pre-cut convoluted strips extend horizontally through the lattice, wherein said strips when viewed in non-convoluted form include non-rectilinearly extending parallel defining edges, the degree of departure from rectilinearity of said edges fixing the extent of departure of the axes of the cells from perpendicularity to the plane of the lattice, and wherein two of the side walls of each hexagonal cell lie in parallel planes inclined to the plane of the lattice at the same angle as that made by the axes of the lattice cells.

3. The sun shade according to claim 1 wherein said pre-cut convoluted strips extend vertically through the lattice, said strips when viewed in non-convoluted form include a pair of rectilinear parallel extending defining edges, and the lines of convolution all extend transversely to said parallel edges at the same acute angle and define the angle between the axes of the cells and the plane of the lattice, and wherein two of the side walls of each hexagonal cell lie in parallel planes perpendicular to the plane of the lattice.

References Cited in the file of this patent

UNITED STATES PATENTS

| | | |
|---|---|---|
| 1,389,294 | Dean | Aug. 30, 1921 |
| 2,319,225 | Grebe et al. | May 18, 1943 |
| 2,445,815 | Youmans | July 27, 1948 |
| 2,722,979 | Janowitz | Nov. 8, 1955 |
| 2,804,921 | Hudson | Sept. 3, 1957 |
| 2,860,740 | Holland et al. | Nov. 18, 1958 |

FOREIGN PATENTS

| | | |
|---|---|---|
| 592,227 | Great Britain | Sept. 11, 1947 |
| 988,034 | France | Apr. 25, 1951 |
| 697,728 | Great Britain | Sept. 30, 1953 |